(12) United States Patent
Coppola et al.

(10) Patent No.: US 8,825,986 B2
(45) Date of Patent: Sep. 2, 2014

(54) SWITCHES AND A NETWORK OF SWITCHES

(75) Inventors: Antonio-Marcello Coppola, Sassenage (FR); Riccardo Locatelli, Fontanil (FR); Jose Flich Cardo, Nules (ES); Jose Cano Reyes, Mislata (ES); Jose Francisco Duato Marin, La Eliana (ES)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 485 days.

(21) Appl. No.: 13/272,342

(22) Filed: Oct. 13, 2011

(65) Prior Publication Data

US 2012/0134364 A1 May 31, 2012

(30) Foreign Application Priority Data

Nov. 22, 2010 (EP) .................................... 10382309

(51) Int. Cl.
*G06F 15/00* (2006.01)
*H04L 12/56* (2006.01)

(52) U.S. Cl.
CPC ................ *H04L 45/06* (2013.01); *H04L 49/25* (2013.01)
USPC ............................................ 712/10; 370/400

(58) Field of Classification Search
USPC ......................................................... 712/10
See application file for complete search history.

(56) References Cited

U.S. PATENT DOCUMENTS 6,504,841 B1 * 1/2003 Larson et al. ................. 370/386
8,151,088 B1 * 4/2012 Bao et al. ........................ 712/11
2006/0227779 A1 * 10/2006 Shimizu ........................ 370/389

OTHER PUBLICATIONS

Mejia, et al: "Region-Based Routing: A Mechanism to Support Efficient Routing Algorithms in NoCs," IEEE Transaction on Very Large Scale Integration (VLSI) Systems, vol. 17, No. 3, Mar. 2009 (pp. 356-369).
EP Search Report and Written Opinion for EP10382309.2 mailed Mar. 17, 2011 (9 pages).
Rodrigo S et al: "Efficient Implementation of Distributed Routing Algorithms for NoCs," IET Computers and Digital Techniques, vol. 3, No. 5, Sep. 1, 2009, pp. 460-475.
Mocholi, Samuel Rodrigo: "Cost Effective Routing Implementations for On-Chip Networks," Universidad Politecnica de Valencia, Oct. 19, 2010, pp. 1-173.
Hu, Wen-Hsiang, et al: "DMesh: a Diagonally-Linked Mesh Network-on-Chip Architecture," The University of California, 2008, pp. 1-7.

* cited by examiner

*Primary Examiner* — Shaq Taha
(74) *Attorney, Agent, or Firm* — Gardere Wynne Sewell LLP

(57) ABSTRACT

A switch includes at least one input configured to receive data and at least two outputs configured to send data to at least two further switches in a network via at least two output links. Each output link has a known hop value. The switch further includes a direction determinator that determines a routing direction for the data from information identifying a relative location of the switch in the network and information identifying a destination of said data. A distributor within the switch processes the routing direction and direction information about each output link in order to select one of said at least two outputs for outputting said data. The selection that is made prioritizes output links for selection which have relatively higher known hop values.

18 Claims, 7 Drawing Sheets

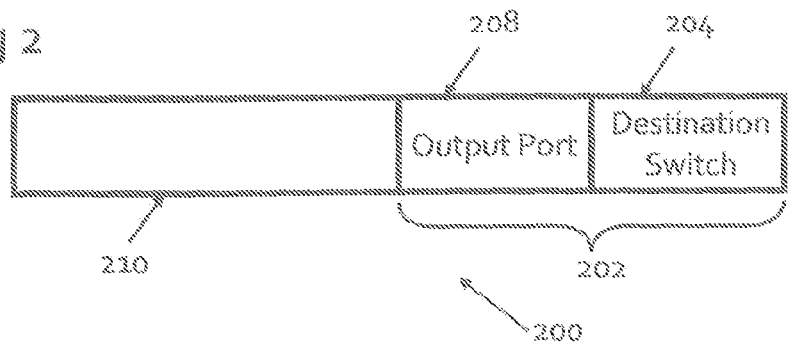
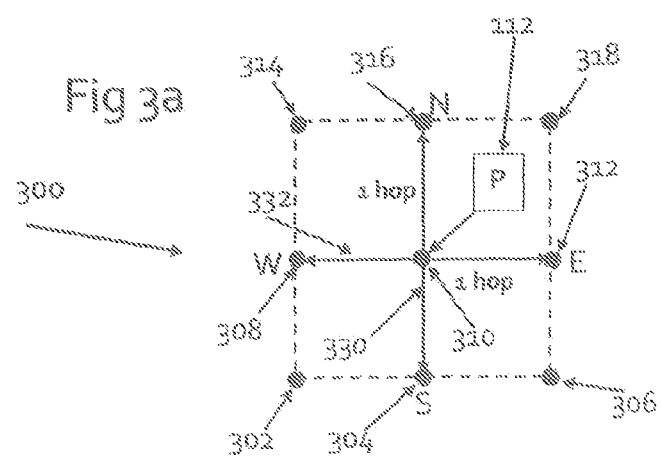
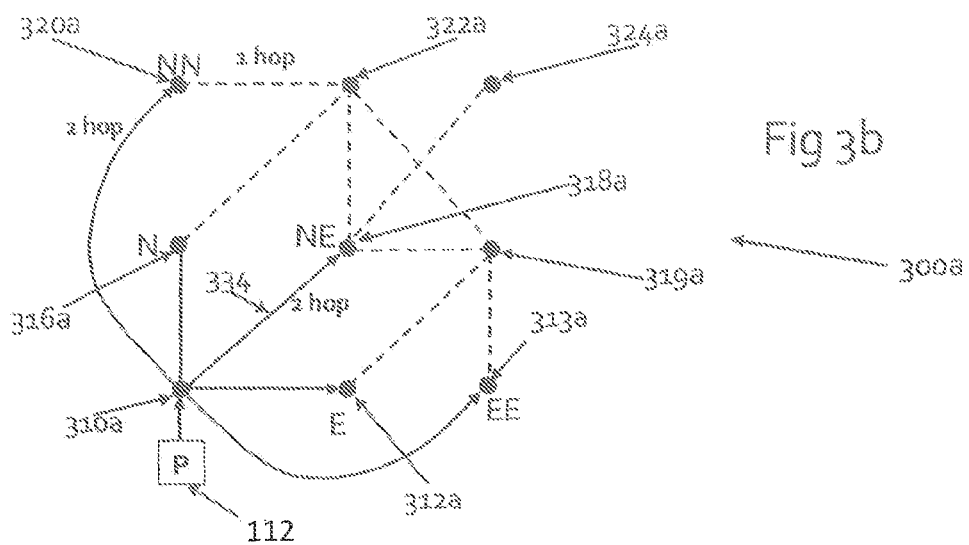

SWITCHES AND A NETWORK OF SWITCHES

PRIORITY CLAIM

This application claims priority from European Patent Application No. 10382309.2 filed Nov. 22, 2010, the disclosure of which is hereby incorporated by reference.

TECHNICAL FIELD

The present invention relates to switches, a network of switches, a method of routing and a method of mapping.

BACKGROUND

Network-on-chip (NoC) is used in order to couple on-chip devices to one another. In order to achieve this, a NoC typically comprises switches, links and end nodes. Links are used to interconnect the switches with each other and the end nodes. The end nodes receive data from and output data to the on-chip devices or chip input/output pins. This forms a network topology or connection pattern wherein the end nodes and/or switches route the data through the topology. NoCs may be regular or irregular in design depending on the size, location and requirements of the components within the chip.

Routing algorithms are used in on-chip networks in order to define the path a data packet must follow through the topology in order to reach its intended destination. There are a number of different methods for implementing routing algorithms in an on-chip network. However, currently, they require the use of routing tables which comprise the route or routes which need to be followed in order to arrive at every possible destination.

In source-based routing, the path taken by the data packet through the network topology is predetermined by the entry node prior to the packet entering the network. Each entry node comprises a node-specific routing table which contains the route or routes required in order to reach every possible exit node. Each link to be used at each switch through which the data packet is to pass is then stored in subsequent fields within a routing subsection of the header of the data packet, wherein the first field contains the name of the first link to be used at the first switch though which the data packet is to pass.

Once the packet has arrived at the first switch, the first switch decodes the second field of the routing header which contains the name of the second switch (or second link). The first switch then transmits the data packet to the second switch which decodes the third field which relates to the third switch and so on until the penultimate field is decoded. The penultimate field indicates the final switch (or the link used to reach the final switch) and the final field indicates the destination or exit node of the packet.

There may be limitations associated with source-based routing. For example, there is no easy means for correction if a switch misdirects the data packet to the wrong subsequent switch. It is also noted that the length of the data header may increase exponentially as the complexity of the network increases. This is because as the number of switches increases, the number of hops required to route the data packet may increase. Furthermore, as the number of switches increases, the number of bits required in each field to identify each of the switches may also increase.

In distributed-based routing, the routing subsection of the data packet header contains the address of the destination exit node of the packet. Each switch contains a unique switch-specific routing table. The switch decodes the address in the data packet header and looks up the address in the routing table to identify the correct subsequent switch (or the link used to reach the subsequent switch) to which the data packet should be routed. This means that the switches determine the route taken by the data packet.

As explained, both distributed and source based routing require the use of destination routing tables which have limitations associated with them. Each switch or entry node may require a personalized table which may take time to encode, as flaws created during the manufacturing process of the network may be chip-specific. Furthermore, as the topologies increase in size, the length of the routing tables may also increase. Larger routing tables may require larger memories which may require larger areas of silicon and may have higher power consumption during operation.

SUMMARY

There is provided according to a first embodiment a switch comprising: at least one input configured to receive data; at least two outputs configured to send data to at least two further switches via at least two output links each of said output links having a known length; a direction determinator configured to determine future direction information for said data from location information of said switch and destination information of said data; and a distributor configured to select one of said at least two outputs on which said data is to be output, wherein said selection uses direction information about each output link, said future direction information and prioritizes longer output links over shorter output links.

The prioritizing may comprise using the indication of the future direction for longer output links to prevent the means for determining from routing said data packet to shorter output links. The selection may further comprise using routing information indicating possible onward connectivity at the further switches for said shorter output links.

The location of said switch may be indicative of the position of said switch within an N Dimensional co-ordinate system and said switch may determine the direction in which to send the packet by comparing said location information of said switch and said destination information of said data for each dimensional axis within the co-ordinate system separately. At least one of said direction determinator and said distributor may comprise logic.

There is provided according to a second embodiment a network comprising: a plurality of end nodes; a plurality of switches as discussed above; and a plurality of links connecting said plurality of end nodes via said plurality of switches.

The at least one switch may be arranged in one of: a regular topology or an irregular topology wherein said irregular topology may be mapped onto a regular topology. The regular topology may comprise N dimensions configured to lie within said N dimensional co-ordinate system. The network may be a communication network.

At least one of said plurality of end nodes may comprise at least one of an initiator and a target.

The network may be mappable onto a regular topology by: determining at least one regular mapping of said at least one switch; and determining at least one supported connection pattern of said at least one regular mapping.

The network may be mappable by determining a routing algorithm for said at least one supported connection pattern of said regular mapping and checking deadlock freedom and connectivity of said routing algorithm for said at least one supported connection pattern of said regular mapping.

There is provided according to a third embodiment a network comprising an irregular topology of switches, wherein said network is mappable onto a regular topology by: determining at least one regular mapping of said switches; determining at least one supported connection pattern of said at least one regular mapping; determining a routing algorithm for said at least one supported connection pattern of said regular mapping; and checking deadlock freedom and/or connectivity of said routing algorithm for said at least one supported connection pattern of said regular mapping.

There is provided according to a forth embodiment method for routing a data packet through a network of a plurality of switches comprising: receiving data at a switch; determining future direction information for said data from location information of said switch and destination information of said data; selecting one of at least two outputs on which said data is to be output, based on direction information about each output link and said future direction information said selecting prioritizing longer output links over shorter output links; and outputting said data to said selected output.

There is provided according to a fifth embodiment method for mapping an irregular network of switches onto a regular N-Dimensional array comprising: determining at least one regular mapping of said switches; determining at least one supported connection pattern of said at least one regular mapping; determining a routing algorithm for said at least one supported connection pattern of said regular mapping; and checking deadlock freedom and/or connectivity of said routing algorithm for said at least one supported connection pattern of said supported regular mapping.

Some embodiments may efficiently code the routing information required by messages in a network with regular or irregular topology.

In some embodiments, there may be routing packets of data across multinode networks. In particular, some embodiments may be used to route data across on-chip networks using extended logic-based distributed routing methods.

BRIEF DESCRIPTION OF THE DRAWINGS

Some embodiments will now be described, by way of example only, with reference to the Figures, in which:

FIG. 2 illustrates a data packet which may be routed along the network,

FIG. 3a illustrates a regular example topology for an on-chip network which supports 1 hop routing, FIG. 3b illustrates a regular example topology for an on-chip network which supports 2 hop routing.

DETAILED DESCRIPTION OF THE DRAWINGS

Figure 1:
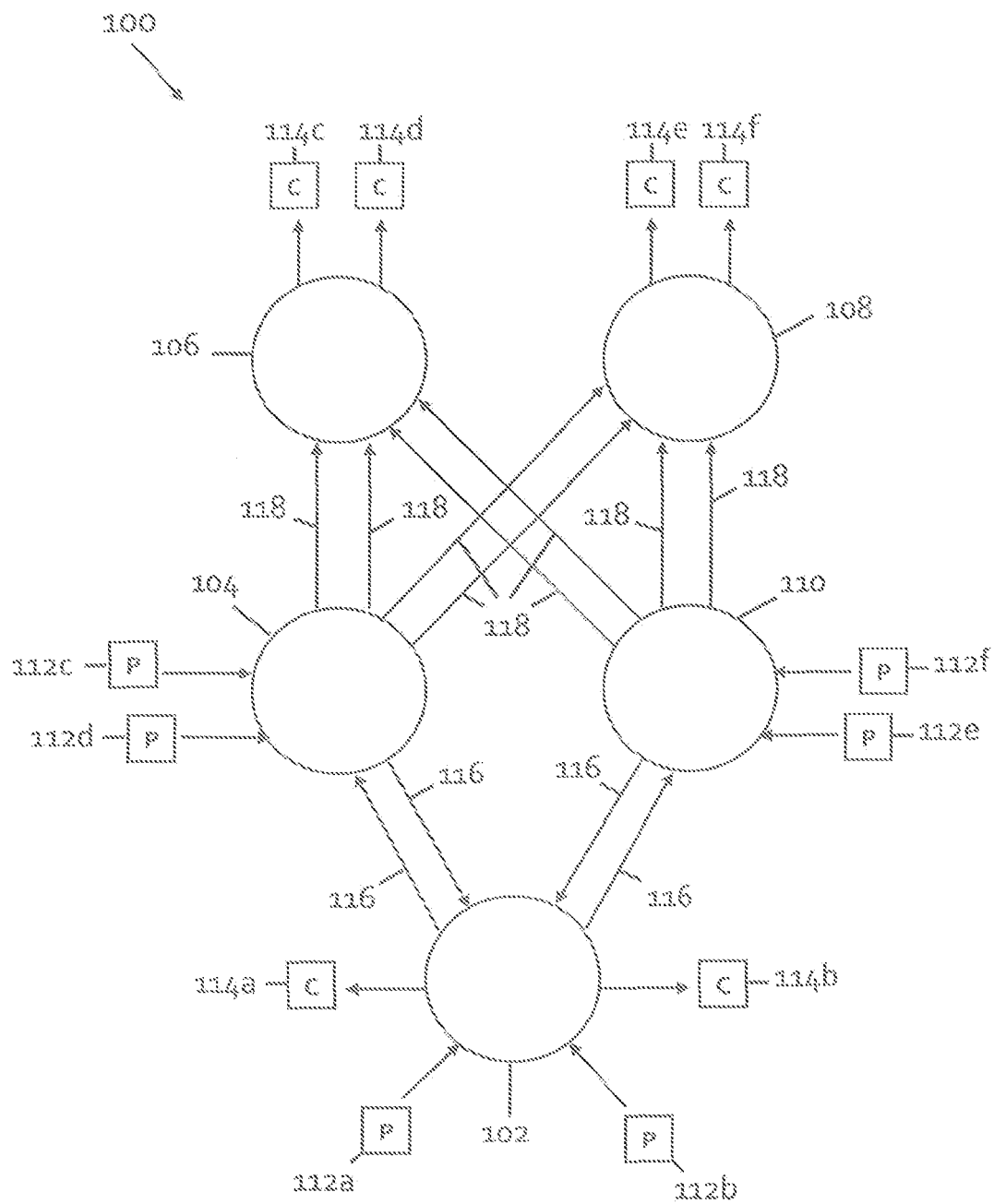
FIG. 1 illustrates an example topology for an on-chip network.

FIG. 1 shows an example irregular topology 100 for an on-chip network. In general terms the network 100 is formed from at least one data input port, entry node or producer 112, and at least one data output port, exit node or consumer 114. The input and output ports are linked together by at least one switch 102, 104, 106, 108, 110 and at least one single connection 116 or double 118 connection.

In the topology 100, switch 102 is connected to two producers 112a, 112b and two consumers 114a, 114b. Switch 102 is also connected to switch 104 via two unidirectional single connections 116, such that switch 102 can transmit data to and receive data from switch 104. Switch 102 is similarly connected to switch 110 via two unidirectional single connections 116. Switch 104 is further connected to two producers 112c, 112d; to switch 106 via a unidirectional double connection 118 and to switch 108 via a second unidirectional double connection 118 such that switch 104 can transmit data packets to switches 106 and 108 but not receive data from these switches. Switch 110 is also connected to two producers 112e, 112f and to two switches 106, 108 via unidirectional double connections 118. Switch 106 is further connected to two consumers 114c, 114d. Switch 108 is also connected to two further consumers 114e, 114f. This topology enables data from any producer 112 to be transmitted to any consumer 114.

Embodiments may support any network topology formed from switches 102, connections 116, 118 and data ports 112, 114 which may be regular or irregular. In some topologies there may not be a route between all producers 112 and all consumers 114 as there may be certain producers 112 which never generate data packets 200 for certain consumers 114. The connections 116, 118 may be unidirectional or bidirectional. The consumers and producers may be target and/or sources or any other suitable data source and/or destination.

Each of the switches 102 is assigned a unique identification number (ID) which is used to route the data as described below. The switch ID will be assigned such that it indicates the relative location of the switch 102 within the network 100. For example a network 100 could be mapped onto a coordinate system with the ID number being a 2 dimensional coordinate representing the location of the switch within the topology or topology mapping. In some embodiments, the origin may be at the center of the network 100 or at a point where most data enters the network 100. The mapping method is explained in more detail below.

Each of the producers 112 and consumers 114 at a specific switch 102 is also assigned a unique identification number. The consumer ID number can be specified relative to the whole network 100 or relative to the other consumers 114 at the relevant switch 102. In some embodiments, a switch 102 may only have one consumer 114 connected to it, in which case the consumer 114 may not need to be identified within the header of the data packet.

FIG. 2 shows a data packet 200 in accordance with an embodiment. The data packet 200 comprises a header 202 and a body 210. The header 202 comprises routing information 204 which identifies the destination switch 102, 104, 106, 108, 110, and port information 208 to identify the consumer 114 at the destination switch.

Although some embodiments may be particularly advantageous in large and/or irregular topologies, embodiments will first be explained using a small regular shaped topology.

FIG. 3a shows a square topology 300 comprising nine switch nodes laid out in a regular 3×3 array where switches 302, 304, 306 are left to right along the bottom row; switches 308, 310, 312 are left to right along the middle row and switches 314, 316, 318 are left to right along the top row. Each node is connected horizontally 330 and vertically 332 to orthogonally adjacent switches. The central switch 310 is also connected to a producer 112. Other producers 112, and consumers 114 may be connected to the switches 302-318, however, these have been omitted for clarity. Data packets at switch 310 can be sent "north" to switch 316, "east" to switch 312, "south" to switch 304, or "west" to switch 308. This is termed a "hop". The solid line links indicate possible first hops for a data packet entering the network 300. The dotted line links indicate future hops which can be made by the packet.

Figure 4A:
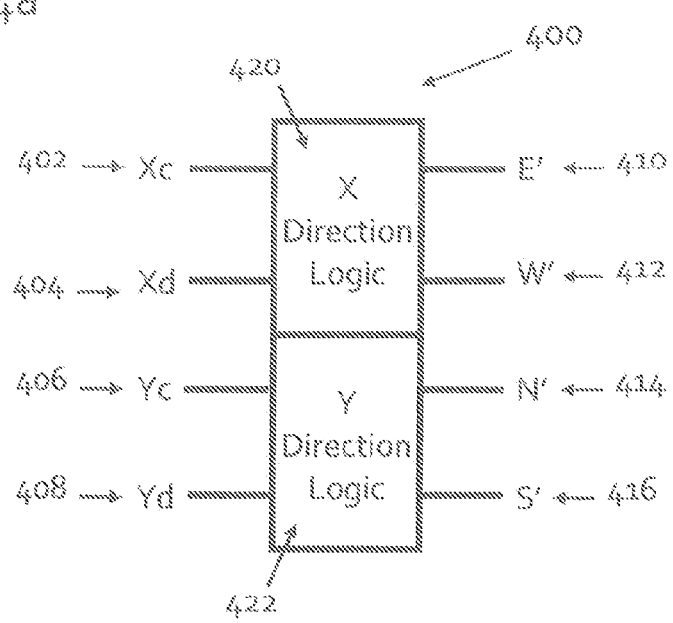
FIG. 4a illustrates a LBDR direction determination unit.

As shown in FIG. 4a, each switch comprises decode logic 400 which compares the switch ID 402, 406 to the routing information 204. This logic is configured to identify whether the packet has reached its destination or in which direction it should be transmitted in order to reach its destination. If the packet has reached its destination switch, the logic will then identify the correct output consumer port 114 from the port information 208.

FIG. 4a is a block diagram of the direction determinator 400 used at each switch within the NoC, in accordance with some level one logic based direction routing (LBDR) embodiments as taught in J. Flich, et al., "Logic-Based Distributed Routing for NoCs," in Computer Architecture Letters, vol. 6, November 2007 (the disclosure of which is hereby incorporated by reference). The direction determinator 400, comprises X-direction logic 420 for the East-West direction and Y-direction logic 422 for the North-South direction.

The x-coordinate 402 of the current switch and the x-coordinate 404 of the packet's destination switch are input into the x-direction logic 420. The logic 420 compares the two x-coordinate values 402, 404 to assess whether the data packet should be sent east, west or retain its current latitude within the network. In some embodiments the X-direction logic 420 flags the East output 410 (E') if the packet is to be sent east, flags the West output 412 (W') if the packet is to be sent west and does not flag either output if the current latitude is to be maintained. In some embodiments a logic value is used to flag a direction. However, other embodiments may use different combinations of the outputs to indicate the direction of transmission.

The Y-direction logic 422 operates in a similar way as the X-direction logic 420. The y-coordinate 406 of the current switch is compared with the y-coordinate 408 of the destination switch and an indication (N', S') of whether the data packet should be sent North, South, or maintain current longitude is produced.

Once the routing directions indicators N', S', E', W', have been determined, routing logic is used to determine from which output the data packet should be sent as it may need to travel in both the x and y directions. Each switch has a set of configuration bits which are determined by the network topology and the routing algorithm being implemented.

Configuration bits are composed of routing bits and connectivity bits. Each switch has four connectivity bits $C_n$, $C_e$, $C_s$ and $C_w$ which are used to indicate to the routing logic whether the switch has an output link in each of the directions. Each switch has routing bits $R_{ab}$ (where a and b can be n, s, e or w). In some embodiments a and b combinations with the same letters are excluded to simplify the routing. However, in other embodiments they may be present.

Each of the routing bits indicates whether a data packet routed via direction "a" can then be routed via direction "b" at the next switch. For example a flagged $R_{ne}$ indicates that packets routed north can be routed east at the next switch. The values of each of the routing bits are dependent on the topology of the network and any limitations imposed by the routing algorithm. A maximum of 12 configuration bits may be required for any switch (for when the switch is connected in all four directions), 4 bits are used to indicate connectivity through the output ports and 8 bits are used to indicate the ability of data packet to change direction at the next switch.

For a LBDR routing direction to be valid, the connectivity bit for that direction should indicate connectivity, the direction indicator for that direction should be flagged and one of: no direction indicator in another direction has been flagged or a direction indicator in another direction has been flagged and the routing bit for the other direction indicates onward routing is available. For example in some embodiments:

A packet may be routed north when there is north connectivity $C_n$ and one of:
  the north indicator N' has been flagged and neither the east indicator E' nor the west indicator W' has been flagged;
  the north indicator N' has been flagged, the east indicator E' has been flagged and the routing bit north-east ($R_{ne}$) has been flagged indicating that the packet can be routed east at the next switch; or
  the north indicator N' has been flagged, the west indicator W' has been flagged and the routing bit north-west ($R_{nw}$) has been flagged indicating that the packet can be routed west at the next switch.

A packet may be routed south when there is south connectivity $C_s$ and one of:
  the south indicator S' has been flagged and neither the east indicator E' nor the west indicator W' has been flagged;
  the south indicator S' has been flagged, the east indicator E' has been flagged and the routing bit south-east ($R_{se}$) has been flagged indicating that the packet can be routed east at the next switch; or
  the south indicator S' has been flagged, the west indicator W' has been flagged and the routing bit south-west ($R_{sw}$) has been flagged indicating that the packet can be routed west at the next switch.

A packet may be routed east when there is east connectivity $C_e$ and one of:
  the east indicator E' has been flagged and neither the north indicator N' nor the south indicator S' has been flagged;
  the east indicator E' has been flagged, the north indicator N' has been flagged and the routing bit east-north ($R_{en}$) has been flagged indicating that the packet can be routed north at the next switch; or
  the east indicator E' has been flagged, the south indicator S' has been flagged and the routing bit east-south ($R_{es}$) has been flagged indicating that the packet can be routed south at the next switch.

A packet may be routed west when there is west connectivity $C_w$ and one of:
  the west indicator W' has been flagged and neither the north indicator N' nor the south indicator S' has been flagged;
  the west indicator W' has been flagged, the north indicator N' has been flagged and the routing bit west-north ($R_{wn}$) has been flagged indicating that the packet can be routed north at the next switch; or
  the west indicator W' has been flagged, the south indicator S' has been flagged and the routing bit west-south ($R_{ws}$) has been flagged indicating that the packet can be routed south at the next switch.

The logic required to define these rules can be summarized as:

$$N = (N' \cdot \overline{E'} \cdot \overline{W'} + N' \cdot E' \cdot R_{ne} + N' \cdot W' \cdot R_{nw}) \cdot C_n \quad (1)$$

$$S = (S' \cdot \overline{E'} \cdot \overline{W'} + S' \cdot E' \cdot R_{se} + S' \cdot W' \cdot R_{sw}) \cdot C_s \quad (2)$$

$$E = (E' \cdot \overline{N'} \cdot \overline{S'} + E' \cdot N' \cdot R_{en} + E' \cdot S' \cdot R_{es}) \cdot C_e \quad (3)$$

$$W = (W' \cdot \overline{N'} \cdot \overline{S'} + W' \cdot N' \cdot R_{wn} + W' \cdot S' \cdot R_{ws}) \cdot C_w \quad (4)$$

The co-ordinate comparison used in some embodiments result in data packets being routed via the shortest possible route.

Figure 4B:
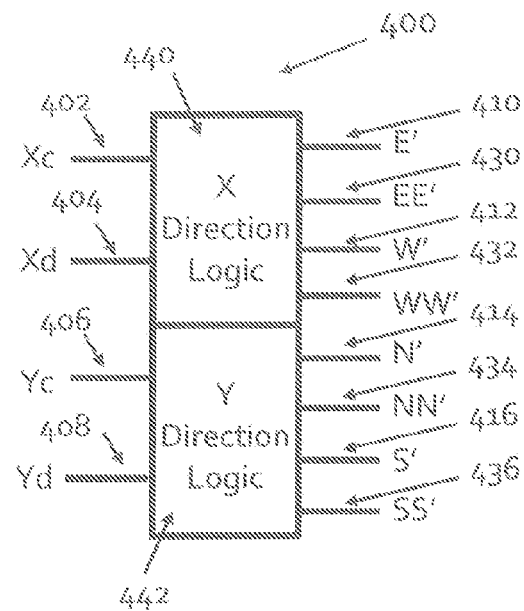
FIG. 4b illustrates a LBDR2 direction determination unit.
Figure 4C:
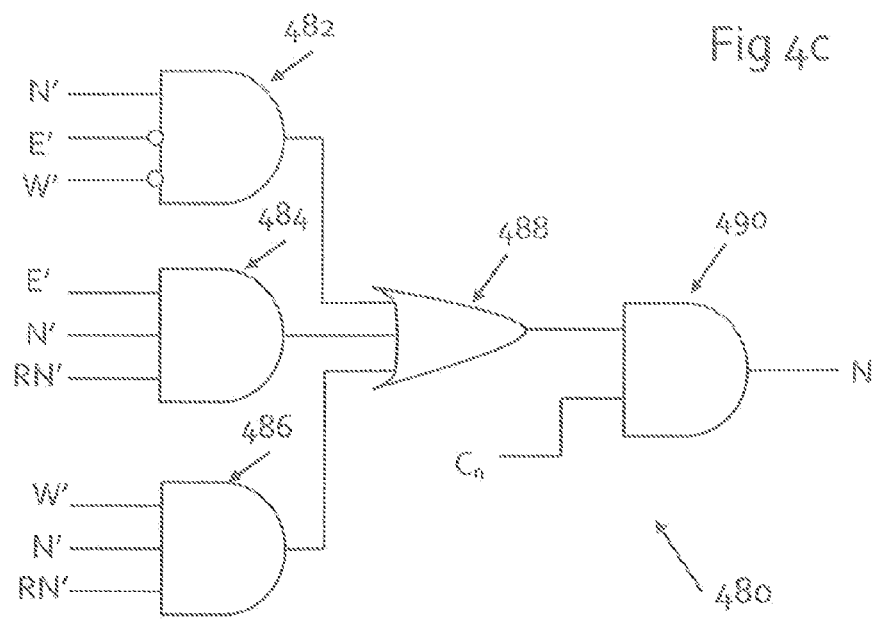
FIG. 4c illustrates a north direction LBDR routing logic circuit.

FIG. 4c shows a routing logic architecture 480 for implementing the determination that a packet is to be routed North defined by equation (1) above using a three-input AND gate 482 with two inverted inputs for the first term within the bracket, two three-input AND gates 484, 486 for the second and third terms within the bracket, one three-input OR gate 488 to combine the three terms within the bracket and a two-input AND gate 490 to combine the bracket with the connectivity bit. The same architecture may be used to implement the South, East and West routing logic.

This design supports a maximum of four outputs per switch. This means that if the destination of the packet is one of the switches 302, 306, 314, 318 located diagonally away from switch 310, then the data packet is sent by two consecutive hops. For example a packet travelling from switch 310 to switch 318 would have to first travel north to switch 316 and then east to switch 318; or east to switch 312 and then north to switch 318.

Furthermore, in an embodiment where switch 310 were missing from topology 300, any data at switch 316 would not be able to reach switch 304 as the switch would try and fail to send the data south. There is a need for extended designs capable of routing data through irregular topologies or topologies where switches have more input and output links. These extended designs are used in some embodiments.

In order to achieve this, FIG. 3b shows modified square 3×3 topology 300a which is formed from 9 switches. Switches 310a, 312a, 313a, are located from left to right on the bottom row; switches 316a, 318a, 319a from left to right on the middle row and switches 320a, 322a, 324a from left to right on the top row. Switch 310a is connected to a producer 112. Other producers 112, and consumers 114 may be connected to the switches 310a-324a however, these have been omitted for clarity. The solid line links indicate possible first hops for a data packet entering the network 300a. The dotted line links indicate future hops which can be made by the packet.

In this topology 300a, as well as switches being connected from north to south or from east to west, switches are connected from north-east to south-west, from north-west to south-east, from north-north to south-south and from east-east to west-west. For example, switch 310a is connected to switch 318a. Some north-south, east-west, north-north and south-south connections are present but not shown in topology 300a. Again, these are not shown for clarity.

These diagonal (NE, NW, SE, SW) links 334 and these double-direction (NN, SS, EE, WW) links 334 are called 2 hop links as they enable data packets 200 which would require two hops in LBDR embodiments (i.e., north then east or east then north) to be transmitted in only one hop (north-east). In topology 300a, only some of the switches are linked diagonally and with double-direction links, however it will be appreciated that, dependent on the requirements of the network, any two switches at a 2 hops distance may be connected together. In topology 300a switches may be linked directly to switches 2 hops north (NN), south (SS), east (EE), west (WW), north east (NE), north west (NW), south east (SE) or south west (SW) as well as switches 1 hop north (N), south (S), east (E) or west (W). Each switch may be linked to receive data from up to 12 other switches and transmit data to up to 12 other switches.

The decode and routing logic in each switch 310 is configured to prioritize sending data packets 200 over 2 hop links 334 as this can reduce the number of switches 310 through which the data packet 200 has to pass. Later, it will be shown how to establish these priorities.

The direction determination logic block 400 shown in FIG. 4b is configured to produce level-2 LBDR (LBDR2) indicators NN', SS', EE', WW' along with the level 1 LBDR indicators N', S', E', W'. This means that as well as comprising the elements of the LBDR direction determination logic, the LBDR2 logic is further configured to produce indications that a packet should be transmitted 2 hops east 430 or west 432 and 2 hops north 434 or south 436.

In LBDR2, the connectivity bits of LBDR are extended to support the new ports and directions available. In order to simplify the routing logic, the routing bits are only used for 1 hop transmissions. This means that the definition of the routing bits in LBDR2 is the same as in LBDR. However, in some embodiments, routing bits may also be used to determine optimum onward routing for 2 hop links.

Twelve connectivity bits ($C_{nn}$, $C_n$, $C_{ne}$, $C_e$, $C_{ee}$, $C_{se}$, $C_s$, $C_{ss}$, $C_{sw}$, $C_w$, $C_{ww}$, $C_{nw}$) will be required for each switch to indicate whether there is an available link in each direction.

In order to efficiently transmit data, 2 hop transmissions are preferred to 1 hop transmissions. The following rules are used to determine the transmission direction:

For a LBDR2 routing direction to be valid for 2 hop links, the connectivity bit for that direction should indicate connectivity and the direction indicator for that direction should be flagged.

The 1 hop link determination is modified such that as well as the connectivity bit for that direction to indicating connectivity, the direction indicator for that direction having been flagged and one of: no direction indicator in another direction having been flagged or a direction indicator in another direction having been flagged and the routing bit for the other direction indicating onward routing is available, none of the 2 hop links should be viable routing options.

For example in some embodiments:

A packet may be routed north-north when there is north-north connectivity $C_{nn}$ and the north-north indicator NN' has been flagged.

A packet may be routed east-east when there is east-east connectivity $C_{ee}$ and the east-east indicator EE' has been flagged.

A packet may be routed south-south when there is south-south connectivity $C_{ss}$ and the south-south indicator SS' has been flagged.

A packet may be routed west-west when there is west-west connectivity $C_{ww}$ and the west-west indicator WW' has been flagged.

A packet may be routed north-east when there is north-east connectivity $C_{ne}$ and the north indicator N' has been flagged and the east indicator E' has been flagged.

A packet may be routed north-west when there is north-west connectivity $C_{nw}$ and the north indicator N' has been flagged and the west indicator W' has been flagged.

A packet may be routed south-east when there is south-east connectivity $C_{se}$ and the south indicator S' has been flagged and the east indicator E' has been flagged.

A packet may be routed south-west when there is south-west connectivity $C_{sw}$ and the south indicator S' has been flagged and the west indicator W' has been flagged.

The logic for the four 1 hop initial ports (N, S, E, W) changes, because now these ports have less priority than the 2 hops ones. The 2hops signal is defined to establish these priorities. This signal is obtained by the logic sum of all the 2 hops ports (NN, SS, EE, WW, NE, NW, SE, SW) values.

A packet may be routed north when the 2hops signal is disabled and north connectivity $C_n$ and one of:

the north indicator N' has been flagged and neither the east indicator E' nor the west indicator W' has been flagged;

the north indicator N' has been flagged, the east indicator E' has been flagged and the routing bit north-east ($R_{ne}$) has been flagged indicating that the packet can be routed east at the next switch; or the north indicator N' has been flagged, the west indicator W' has been flagged and the routing bit north-west ($R_{nw}$) has been flagged indicating that the packet can be routed west at the next switch.

A packet may be routed south when the 2hops signal is disabled and south connectivity $C_s$ and one of:

the south indicator S' has been flagged and neither the east indicator E' nor the west indicator W' has been flagged;

the south indicator S' has been flagged, the east indicator E' has been flagged and the routing bit south-east ($R_{se}$) has been flagged indicating that the packet can be routed east at the next switch; or the south indicator S' has been flagged, the west indicator W' has been flagged and the routing bit south-west ($R_{sw}$) has been flagged indicating that the packet can be routed west at the next switch.

A packet may be routed east when the 2hops signal is disabled and east connectivity $C_e$ and one of:

the east indicator E' has been flagged and neither the north indicator N' nor the south indicator S' has been flagged;

the east indicator E' has been flagged, the north indicator N' has been flagged and the routing bit east-north ($R_{en}$) has been flagged indicating that the packet can be routed north at the next switch; or the east indicator E' has been flagged, the south indicator S' has been flagged and the routing bit east-south ($R_{es}$) has been flagged indicating that the packet can be routed south at the next switch.

A packet may be routed west when the 2hops signal is disabled and west connectivity $C_W$ and one of:

the west indicator W' has been flagged and neither the north indicator N' nor the south indicator S' has been flagged;

the west indicator W' has been flagged, the north indicator N' has been flagged and the routing bit west-north ($R_{wn}$) bit has been flagged indicating that the packet can be routed north at the next switch; or the west indicator W' has been flagged, the south indicator S' has been flagged and the routing bit west-south ($R_{ws}$) has been flagged indicating that the packet can be routed south at the next switch.

The modification to the 1 hop determinations ensures that possible 2 hop transmissions are prioritized over possible 1 hop transmissions.

The logic required to define these rules can be summarized as:

$$NN = NN' \cdot C_{nn} \quad (5)$$

$$EE = EE' \cdot C_{ee} \quad (6)$$

$$SS = SS' \cdot C_{ss} \quad (7)$$

$$WW = WW' \cdot C_{ww} \quad (8)$$

$$NE = N' \cdot E' \cdot C_{ne} \quad (9)$$

$$NW = N' \cdot W' \cdot C_{nw} \quad (10)$$

$$SE = S' \cdot E' \cdot C_{se} \quad (11)$$

$$SW = S' \cdot W' \cdot C_{sw} \quad (12)$$

$$2\text{hops} = NE + NW + SE + SW + NN + SS + EE + WW \quad (13)$$

$$N = N'' \cdot C_n \cdot \overline{2\text{hops}} \quad (14)$$

$$S = S'' \cdot C_s \cdot \overline{2\text{hops}} \quad (15)$$

$$E = E'' \cdot C_e \cdot \overline{2\text{hops}} \quad (16)$$

$$W = W'' \cdot C_w \cdot \overline{2\text{hops}} \quad (17)$$

where:

$$N'' = N' \cdot \overline{E'} \cdot \overline{W'} + N' \cdot E' \cdot R_{ne} \cdot N' \cdot W' \cdot R_{nw} \quad (18)$$

$$S'' = S' \cdot \overline{E'} \cdot \overline{W'} + S' \cdot E' \cdot R_{se} \cdot S' \cdot W' \cdot R_{sw} \quad (19)$$

$$E'' = E' \cdot \overline{N'} \cdot \overline{S'} + E' \cdot N' \cdot R_{en} \cdot E' \cdot S' \cdot R_{es} \quad (20)$$

$$W'' = W' \cdot \overline{N'} \cdot \overline{S'} + W' \cdot N' \cdot R_{wn} \cdot W' \cdot S' \cdot R_{ws} \quad (21)$$

It will be appreciated that equations 18, 19, 20 and 21 define the same functions as equations 1, 2, 3 and 4 respectively.

Figure 4D:
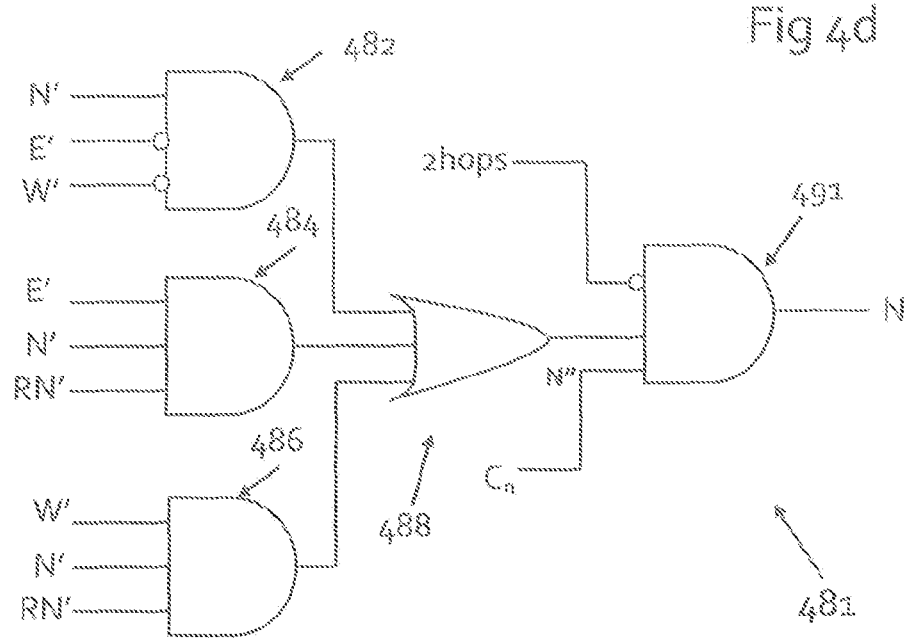
FIG. 4d illustrates part of a north direction LBDR2 routing logic circuit.

FIG. 4d shows a routing logic architecture 481 for implementing the determination that a packet is to be routed North defined above in equation 14. The N" term is derived using the same three 3-input AND gates and 1-input OR gate used by LBDR. The fourth AND gate is another 3-input AND gate 491 to combine the N" value, the connectivity bit and the inverse of the 2hops signal value. The same architecture may be used to implement the South, East and West routing logic.

Figure 4E:
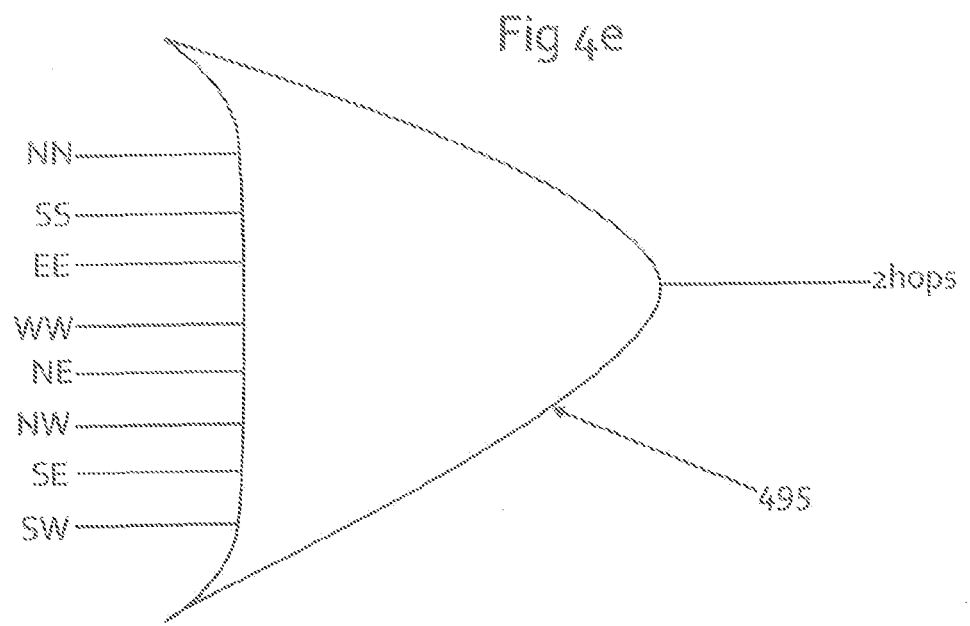
FIG. 4e illustrates part of a north direction LBDR2 routing logic circuit.

FIG. 4e shows an architecture 495 for generating the 2hops signal value. The north-north NN, south-south SS, east-east EE, west-west WW, north-east NE, north-west NW, south-east SE and south-west SW indicators are input into an 8-input OR gate. The OR gate outputs the 2hops signal.

As there are diagonal links and double-direction links between switches, problems created by missing switches can be solved. For example, again with reference to FIG. 3b, if switch 318a is missing, and data needs to be sent from switch 322a to switch 312a, it can be directly sent south-south.

Figure 3C:
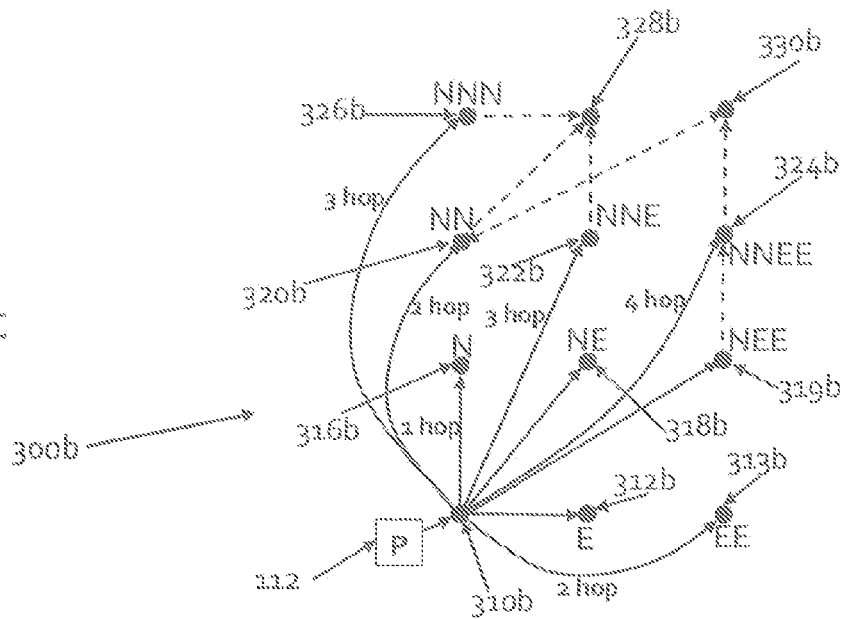
FIG. 3c illustrates a regular example topology for an on-chip network which supports 3 hop routing.

Some embodiments may support longer links such as those shown in FIG. 3c using level 3-LBDR (LBDR3) which is discussed in more detail below. The number of hops a particular link can avoid needing to be taken is called its hop value.

Figure 5A:
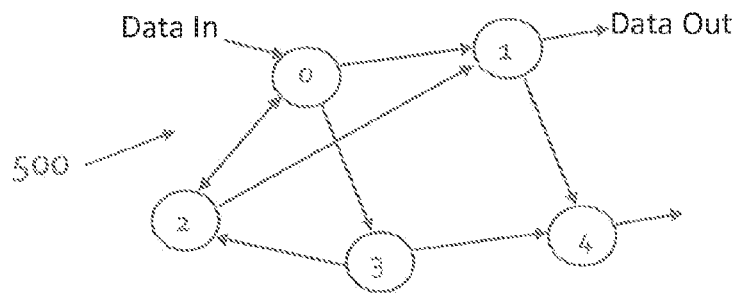
FIG. 5a illustrates an example topology for an on-chip network.

LBDR2 and LBDR3 embodiments may be used to route packets in irregular topologies. FIG. 5a shows a simple example irregular topology 500. The topology comprises five switches 0, 1, 2, 3, and 4. Switches 0, 1, 3 and 4 are arranged in a quadrilateral with unidirectional links such that switch 0 can transfer data to switches 1 and 3 and switch 4 can receive data from switches 1 and 3. Switch 2 is connected to switch 0 via a bi-directional link and to switch 1 via a unidirectional link. Switch 2 is also connected to receive data from switch 3 via a unidirectional link. Data is input into the topology via an end link at switch 0 and output from the topology via end links at switches 1 and 4.

Figure 5B:
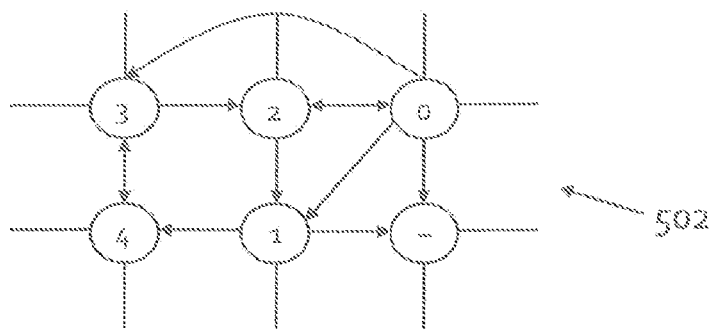
FIG. 5b illustrates a first mapping of the topology of FIG. 5a, FIG. 5c illustrates a second mapping of the topology of FIG. 5a, FIG. 5d illustrates a third mapping of the topology of FIG. 5a, and FIG. 6 illustrates a mapping method according to an embodiment.

FIG. 5b shows a mapping of the irregular topology 500 which may be supported by LBDR2. The mapping method will be explained in more detail below. The switches are mapped onto a 2-dimensional regular array. Switch 0 is the upper right switch. Switch 1 is the lower middle switch. Switch 2 is the upper middle switch. Switch 3 is the upper left switch. Switch 4 is the lower left switch. The lower right switch point is bypassed. The link connections between the switches are as in topology 500.

Figure 5C:
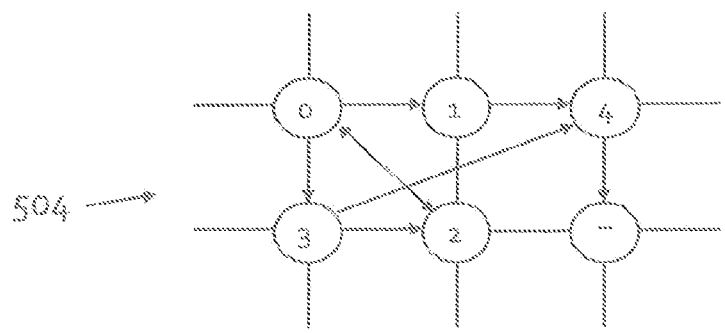

FIG. 5*c* shows a mapping of the irregular topology 500 which may not be supported by LBDR2. The switches are mapped onto a 2-dimensional regular array. Switch 0 is the upper left switch. Switch 1 is the upper middle switch. Switch 4 is the upper right switch. Switch 3 is the lower left switch. Switch 2 is the lower middle switch. The lower right switch point is bypassed. The link connections between the switches are as in topology 500.

Figure 5D:
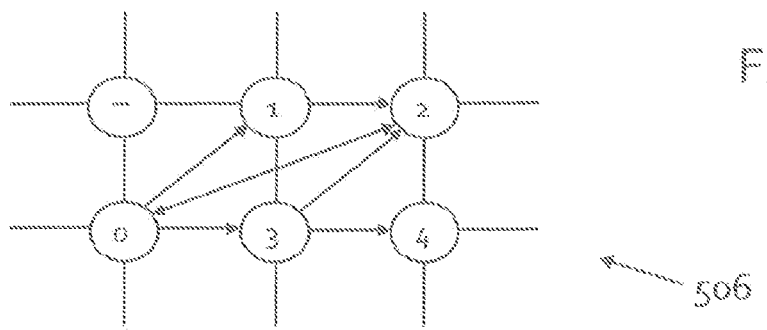

FIG. 5*d* shows a mapping of the irregular topology 500 which may not be supported by LBDR2. The switches are mapped onto a 2-dimensional regular array. Switch 1 is the upper middle switch. Switch 2 is the upper right switch. Switch 0 is the lower left switch. Switch 3 is the lower middle switch. Switch 4 is the lower right switch. The upper left switch point is bypassed. The link connections between the switches are as in topology 500.

Figure 6:
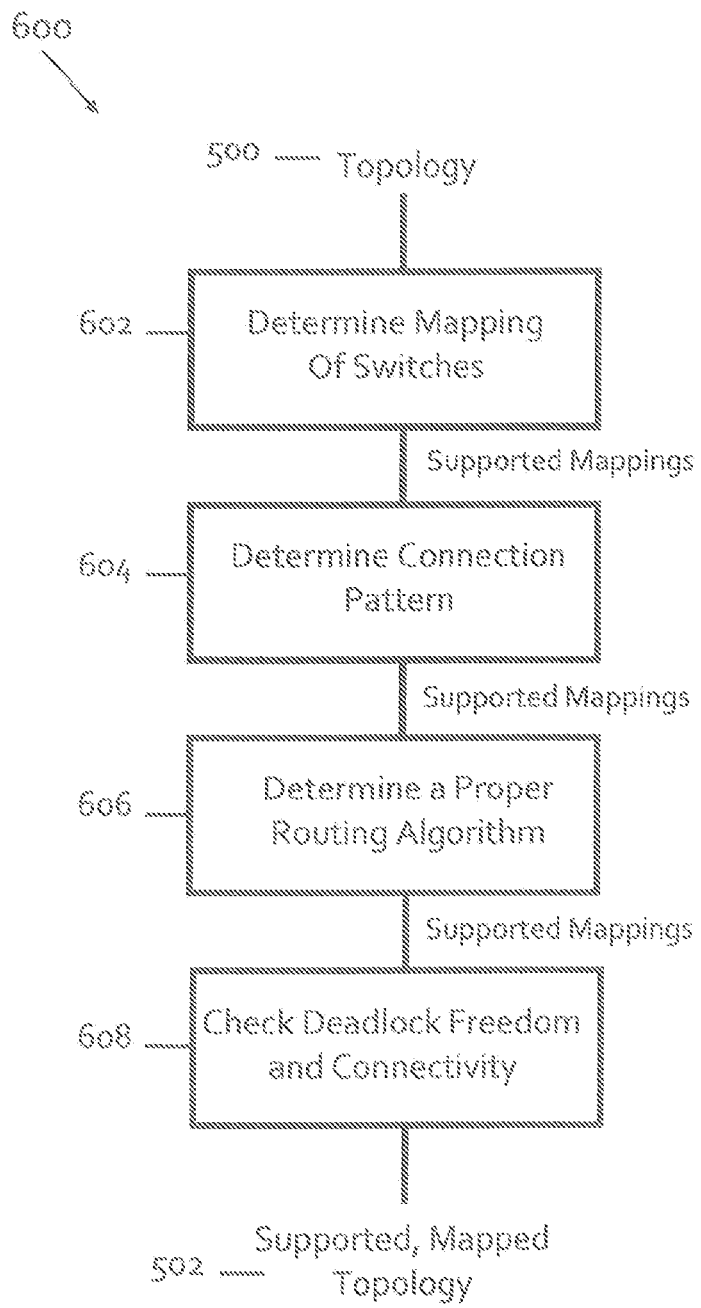

The coordinate system used by some embodiments requires the switch topologies to be arranged in a regular array. In order to apply the method to irregular arrays, the irregular arrays are mapped onto a regular array. FIG. 6 shows a method 600 for determining mapped topologies which are supported by the level of LBDR. The mapping will be explained in terms of LBDR. However, the mapping method may be used to map irregular topologies for other purposes. The mapping method does not change the physical topology (i.e. the connection pattern between end nodes, switches, and links is not changed).

In some embodiments, the topologies may be mapped during the chip manufacturing stage. In some embodiments the topologies may be mapped during the chip programming stage. In some embodiments the topologies may be mapped during the product manufacturing stage. In some embodiments the topologies may be mapped by the end-user. Embodiments may be able to re-map the topologies between uses. It should be appreciated that mapping may occur in any one or more of the above scenarios with some embodiments.

Topology 500 is input and possible mappings of the switches are determined 602. Possible connection patterns are determined 604 and then proper routing algorithms are determined 606. A deadlock freedom and connectivity check is performed 608 before outputting supported mapped topologies 502.

The first stage 602 provides initial mappings of the switches onto a 2D grid. In some embodiments, only switches and inter-switch links are considered during the mapping while end nodes and end node-switch connections are ignored. The mapping grid diameter may be minimized and made as square as possible. The differences between the diameters in each direction should be minimized. Every possible mapping may be generated, however, some of these may be easily discounted as being sub optimal. The first stage outputs switch mappings 502, 504, 506 without links or connection patterns.

The second stage 604 generates the connection patterns for each of the mappings 502, 504, 506. In some embodiments only the switch links and their directions are considered. During the connection pattern determination 604, the number and direction of possible outputs and inputs available to switches which is supported by the level of LBDR is required. For example, LBDR2 supports a maximum of 12 input ports and 12 output ports for each switch (N, NN, NE, E, EE, SE, S, SS, SW, W, WW, NW). It is noted that not all of the input and output ports may need to be used at each switch and that the number of input ports used need not equal the number of output ports.

At each switch any of the possible directions may be used. However, only one port may be provided in any output direction. A direction may have both an input and output port, for example, to support bi-directional links. In mapping 506 depicted in FIG. 5*d*, Switch 0 has two output links in the north east direction $\vec{01}$, $\vec{02}$. Therefore this mapping 506 is not supported by LBDR2 and would be eliminated. It is not supported by LBDR2 because a packet at 0 destined for 1 or 2 would be designated a NE transmission direction but the logic used by LBDR2 cannot differentiate between the two links as each leave from the north-east. A higher level of LBDR may be needed to support this mapping 506.

The second stage also analyzes the linked mappings to determine whether they result in an unconnected network which would also not be supported. For example, in mapping 504 in FIG. 5*c* a packet at Switch 3 destined for Switch 1 would be sent along link $\vec{34}$ as the logic in switch 3 would determine that switch 1 is located to the north-east of switch 3. However, as there is no link $\vec{41}$, the packet will reach a dead end and be unable to reach its intended destination. Therefore mapping 504 is also not supported by LBDR2. A higher level of LBDR may be needed to support this mapping 504.

At this stage, only mapping 502 has resulted in a LBDR2 supported link layout as each link at each switch has a unique direction, there are no dead ends and all destinations may be reached. Unsupported mappings 504, 506 are discarded at each stage of the mapping process.

Suitable routing algorithms must then be determined 606 for the remaining supported mappings 502 in order to ascertain whether there are any cycles which could result in a data packet being stuck in a loop. For example, in mapping 502, a clockwise cycle could be established which would send data $\vec{03}\,\vec{32}\,\vec{20}$. This is more likely to be a problem in large topologies. Routing algorithms can be applied in order to remove such cycles.

In some embodiments the routing algorithm used is SR (segment-based routing). This algorithm involves dividing the network into segments and placing routing restrictions in each segment. For example, a routing restriction is placed between two consecutive links to prevent any message from using both links sequentially. A. Mejia, et al., "Segment-based routing: an efficient fault-tolerant routing algorithm for meshes and tori", IPDPS, 2006 discusses segment-based routing in more detail (the disclosure of which is hereby incorporated by reference).

Routing restrictions represent routing algorithms by establishing a set of allowable paths which to do not cross restrictions established to avoid cycles. In some LBDR2 embodiments, the routing restrictions are computed using only the 1 hop links in the mapped topology in order to simplifying the LBDR2 implementation logic whilst avoiding the establishment of cycles. In mapped topology 502, a restriction may be placed at switch 2 in order to prevent a packet originating from switch 3 to crossing switch 2 to reach switch 0. The routing bits are used by the routing algorithms to implement routing restrictions.

The final stage in generating supported mapped topologies 502 involves checking deadlock freedom and connectivity 608 once the end nodes have been connected to the switches.

This stage checks that the original connectivity of the topology 500 is maintained. In particular, as LBDR systems route data packets using minimal paths such that the packet is always getting closer to its destination, some routed candidate topologies may result in unconnected end-nodes similar to the unconnected switches in unsupported mapped topology 504.

In some embodiments, all communication flows are tested during the checking stage 608. The flows may be tested by searching for a valid LBDR2 path between each producer and each consumer. If there is no valid route between at least one producer and at least one consumer, the mapping is not supported by LBDR2.

The mapping method 600 may produce more than one supported mapped topology 502. Other criteria may then be used to select an optimum mapped topology 502 such as providing the shortest routes between end-links or routing traffic evenly across the topology such that bottlenecks are reduced. A supported LBDR2 topology 502 is then output and used to configure each switches coordinate value and logic as described above.

Some topologies may not be able to be successfully mapped on the minimum possible 2D grid size for a given level of LBDR. Such topologies may be mapped onto larger 2D grid sizes, larger dimension grid sizes (e.g.: using a 3 dimensional grid), or be implemented using a higher level of LBDR. Minimizing the grid size, number of grid dimensions and level of LBDR may minimize the memory required to store the coordinate of the switch within the mapped topology and the required processing logic required to route the data packets.

Returning to LBDR3, FIG. 3c shows a 3×4 topology 300b comprising 12 nodes. Starting from the bottom left hand corner of the array switches 310b, 312b, 313b, are located from left to right on the bottom row; switches 316b, 318b, 319b from left to right on the second row; switches 320b, 322b, 324b from left to right on the third row and switches 326b, 328b and 330b from left to right on the top row. Switches may be interconnected using 1 hop and 2 hop connections as discussed above. Topology 300b also has some switches interconnected by 3 hop and 4 hop links. Switch 310b is linked to each one of switches 312b, 313b, 316b, 318b, 319b, 320b, 322b, 324b. Switches 318b and 319b are also linked to switch 324b. Switch 320b is also linked to switches 328b and 330b. Switch 322b is also connected to switch 328b. Switch 324b is also connected to switch 330b. Switch 326b is also connected to switch 328b. Full line links indicate possible links available for a data packet entering the network 300a. Dotted line links indicate future hops which can be made by the packet.

Data packets are input into the topology from producer 112 to switch 310b. If the data needs to be sent due east then it can be sent 1 hop east via a 1 hop link to switch 312b or 2 hops east via a 2 hop link to switch 313b. If the data needs to be sent due north, then it can be sent 1 hop north via a 1 hop link to switch 316b, 2 hops north via a 2 hop link to switch 320b or 3 hops north via a 3 hop link to switch 326b. If data is headed in a direction between north and east, as well as being sent 2 hops north-east via a 2 hop link to switch 318b, it can be sent 3 hops north-north-east via a 3 hop link to switch 322b (located north of switch 318b) or 3 hops north-east-east via a 3 hop link to switch 319b (located east of switch 318b).

LBDR3 supports triple links (North-North-North, South-South-South, East-East-East and West-West-West), diagonal links (North-North-East, North-East-East, South-East-East, South-South-East, North-North-West, North-West-West, South-South-West and South-West-West), and the previously discussed LBDR2 and LBDR links.

The LBDR2 direction determinator logic may be modified to support 3 hop links such that LBDR3 can be implemented. The modifications may comprise configuring the determinator such that both the 1 hop indicator and 2 hop indicator are used to flag a 3 hop link in one direction, or such that the logic determinator may be configured to generate a 3 hop indicator.

The LBDR2 routing logic may be modified to support LBDR3 routing. Connectivity and Routing bits similar to those described with respect to LBDR2 are used in the LBDR3 routing. A 3 hop masking indicator similar to the 2 hop mask described above may be used to prioritize 3 hop links over 2 hop links. In some embodiments routing bits may be used to select a preferred 2 hop link if no 3 hop links are suitable.

The LBDR3 direction determinator and routing logic may be modified to support LBDR4 which can send data packets along links up to 4 hops long. Embodiments may be modified to support LBDRn which can send data packets along links up to n hops long. The number of supported links in each of the levels may depend on the space available within the switch for routing logic. A direction determination logic for LBDR4 may support 4 hop links such as the NNEE link between switches 310b and 324b.

In the described embodiments, the switches comprise logic for determining all possible directions and routing in all possible directions regardless of whether there is an available link in that direction. This simplifies the manufacture of the NoCs as only one switch design is necessary. However, in some embodiments, the minimization of the NoC may be a priority. Switches in such embodiments may each be designed independently in view of the mapped topology such that a switch which only has links to send data north or south only comprises North-South determination logic 422, 442 and the associated routing logic and configuration bits.

Referring again to FIG. 1, as previously discussed, the connection links may be single links 116 or double links 118. These double links or double port connections produce alternative routes within the network 100. In some embodiments, the flow of data may be forced through some connections in preference to others. A field comprising "special bits" within the header may be used to indicate preferred links. The number of special bits determines the maximum number of double ports that can be used by a particular packet. One bit will be used for each double link the data packet passes.

It should be appreciated that the number of switches, input ports and exit ports shown in the Figures is by way of example and any suitable number of switches, input ports and exit ports may be used in alternative embodiments.

It is noted that in some embodiments, different coordinate systems may be preferable over the Cartesian system used to explain the invention. The coordinate system may even be designed specifically to meet the requirements of the network topology.

Some embodiments of the invention may provide compact fast efficient methods for routing data packets in on-chip networks which do not rely on large routing tables to steer the data packets through the network.

Data may be in alternative embodiments in a form other than packet form.

Embodiments of the invention have been described in terms of an on-chip network. However, other embodiments may be used in other types of network. Non-limiting examples could be wired or wireless communications networks, local area networks, or off-chip networks within a piece of hardware.

Various modifications to the embodiments described above will readily occur to the skilled person. The invention is not limited to these specific examples.

What is claimed is:

1. A network, comprising:
a plurality of end nodes;
a plurality of switches mappable onto a regular topology by:
  determining at least one N-dimensional array mapping of said switches; and
  determining at least one supported connection pattern of said at least one N-dimensional array mapping;
  determining a routing algorithm for said at least one supported connection pattern; and
  checking deadlock freedom and connectivity of said routing algorithm for said at least one supported connection pattern of said N-dimensional array mapping; and
a plurality of links interconnecting said plurality of end nodes via said plurality of switches;
wherein at least one of said switches comprises:
  at least one input configured to receive data;
  at least two outputs configured to send data to at least two further switches in said network via at least two of said links each of said links having a known hop value;
  a direction determinator configured to determine a routing direction for said data from information identifying a relative location of said switch in said network and information identifying a destination of said data; and
  a distributor configured to process the routing direction and direction information about each link in order to select one of said at least two outputs for outputting said data, wherein said selection prioritizes links for selection which have relatively higher known hop values.

2. The network as claimed in claim 1, wherein said distributor is further configured to prevent selection of one of the links having a relatively lower known hop value.

3. The network as claimed in claim 1, wherein said distributor is further configured to select using routing information indicating possible onward connectivity at other switches in the network for links having a relatively lower known hop value.

4. The network as claimed in claim 1, wherein the known hop value for each link is indicative of a number of data transmission hops needed to reach a destination switch from said switch.

5. The network as claimed in claim 1, wherein at least one of said direction determinator and said distributor comprises logic.

6. The network as claimed in claim 1, wherein said plurality of switches are arranged in an irregular topology mapped onto said regular topology.

7. The network as claimed in claim 6, wherein said relative location of said switch is indicative of the position of said switch within a co-ordinate system of the N Dimensional array mapping and said switch determines the direction in which to send the packet by comparing said relative location of said switch and information identifying the destination of said data for each dimensional axis within the co-ordinate system separately.

8. The network as claimed in claim 1, wherein said network is a communication network.

9. The network as claimed in claim 8, wherein at least one of said plurality of end nodes comprises at least one of an initiator and a target.

10. A method for routing a data packet through a network of a plurality of switches comprising:
mapping said plurality of switches onto a regular topology by:
  determining at least one N-dimensional array mapping of said switches; and
  determining at least one supported connection pattern of said at least one N-dimensional array mapping;
  determining a routing algorithm for said at least one supported connection pattern; and
  checking deadlock freedom and connectivity of said routing algorithm for said at least one supported connection pattern of said N-dimensional array mapping;
receiving data at one of the plurality of switches having at least two outputs configured to send data to at least two further switches via at least two output links, each of said output links having a known hop value;
determining a routing direction for said data from information identifying a relative location of said switch in said network and information identifying a destination of said data;
processing the routing direction and direction information about each output link in order to select one of said at least two outputs for outputting said data, wherein the selection prioritizes output links for selection which have relatively higher known hop values; and
outputting said data to said selected output.

11. A method for mapping an irregular topology for a network of switches onto a regular topology in the form of an N-Dimensional array comprising:
determining at least one N-dimensional array mapping of said switches;
determining at least one supported connection pattern of said at least one N-dimensional array mapping;
determining a routing algorithm for said at least one supported connection pattern of said N-dimensional array mapping; and
checking deadlock freedom and connectivity of said routing algorithm for said at least one supported connection pattern of said N-dimensional array mapping.

12. The method of claim 11, wherein N=2 and wherein determining the at least one N-dimensional array mapping comprises:
assigning a unique identification to each of said switches;
wherein the unique identification is a coordinate representing a location of the switch in the 2-dimensional array.

13. The method of claim 11, further comprising outputting said at least one supported connection pattern which is has deadlock freedom and connectivity.

14. The method of claim 11, further comprising:
receiving data at one of the switches;
determining a routing direction for said data from information identifying a relative location of said switch in said network and information identifying a destination of said data;
selecting one of at least two outputs for outputting said data over links based on the routing direction, wherein selecting prioritizes selection for output of longer links over shorter links; and
outputting said data to said selected output.

15. The method of claim 10, wherein said relative location of said switch is indicative of the position of said switch within an N-dimensional co-ordinate system representing said network and wherein determining comprises the routing direction by comparing said relative location of said switch and information identifying the destination of said data for each dimensional axis within the co-ordinate system separately.

16. The method of claim 15, wherein said regular topology comprises N dimensions configured to lie within said N dimensional co-ordinate system.

17. The method of claim 10, wherein the known hop value is indicative of a number of data transmission hops needed to reach a destination from said switch.

18. The method of claim 10, wherein processing to select comprises using routing information indicating possible onward connectivity at other switches in the network for output links having a relatively lower known hop value.

* * * * *